United States Patent Office 2,977,291
Patented Mar. 28, 1961

2,977,291
PURIFICATION OF GLYCEROL

Ludwig A. Hartmann, Swarthmore, Pa., assignor to Atlas Powder Company, Wilmington, Del., a corporation of Delaware No Drawing. Filed Feb. 10, 1958, Ser. No. 714,062

8 Claims. (Cl. 202—57)

This invention relates to the production of lower polyhydric alcohols by hydrogenolysis of saccharidic materials and more particularly to the recovery of high purity glycerol from the reaction mixture obtained on such hydrogenolysis.

Processes for producing mixtures of polyhydric alcohols containing substantial proportions of two-, three- and four-carbon chain polyhydric alcohols from saccharidic materials by catalytic hydrogenolysis under pressure are well known. The autoclave discharge product from such a process contains a mixture of polyhydric alcohols. Among the identifiable products there are ethylene and propylene glycols, methyl glycerol, glycerol, tetritols (erythritol, for example), hexanetriols, hexanepentols and hexitols. Some cyclic compounds, particularly hydroxyl bearing tetrahydrofuran derivatives may also be present. The relative proportions of the foregoing and related polyhydric materials in the mixture may be controlled to some extent by the choice of catalyst and reaction conditions but it is not feasible to selectively produce or avoid the production of any one of them in the hydrogenolysis reaction.

Because of the complexity of the reaction mixture and close similarity in chemical nature of the components thereof, complete resolution of the hydrogenolysis product into its several chemical species by fractional distillation is impractical if not impossible.

It is the primary object of the present invention to provide a process for recovering glycerol of high purity from hydrogenolysis products of the type aforesaid.

Other objects will become apparent in the course of the following description of the invention and in the appended claims.

For purposes of description the raw material of the process of the invention will be taken as the autoclave discharge product which has been separated from catalyst (suitably by filtration) and from ionic impurities (suitably by treatment with ion-exchange resins) by methods well known in the art of manufacturing polyhydroxylic compounds. The said raw material will be referred to hereinafter as the crude hydrogenolysis product.

In broad outline the process of the present invention comprises the steps of subjecting a distillation cut containing substantially all of the glycerol of the crude hydrogenolysis product together with impurities distilling therewith to treatment with sulfuric acid under conditions to be more fully described hereinbelow, neutralizing the acid treated material, and fractionally distilling the neutralized product to obtain a glycerol fraction of high purity. The said distillation cut may conveniently be obtained by concentration of the crude hydrogenolysis product, stripping to separate substantially all of the glycerol together with materials distilling therewith from the non-volatile residue, and subjecting the strippings to a rough fractional distillation to remove at least the major portion of the glycols and other more volatile components.

The concentration, stripping, and rough fractionation steps outlined above are carried out in conventional manner. Conveniently, water and other volatile components are distilled off at atmospheric pressure or flashed off under high vacuum and low temperature after which the concentrate is vacuum- or vacuum-steam stripped until the still residue is substantially glycerol free, e.g., until the still residue temperature reaches 195° C. under a vacuum of 25 feet of water. The volatile portion is then fractionally distilled under reduced pressure to remove the glycols. Also, if desired, the fractional distillation may be continued, collecting the portion distilling at the boiling point of glycerine and rejecting the less volatile residue. By either of the foregoing procedures, there is obtained a crude glycerol cut containing substantially all of the glycerol from the crude hydrogenolysis product together with varying proportions of related polyhydric materials, particularly methyl glycerol, 1,2,4-butanetriol, hexanetriols, erythritol and other tetritols, erythritan, tetrahydrofuran derivatives, with possibly minor proportions of ethylene glycol, polyhydroxy pentanes, and other unknown polyhydric materials.

In accordance with the invention the fraction of crude hydrogenolysis product containing the glycerol and other components distillable with glycerine is heated with sulfuric acid, neutralized and fractionally distilled, all as more fully described hereinafter. A glycerol fraction of high purity is thus obtained.

In the acid treatment step the glycerol-containing fraction is treated with from 0.05% to 2.5% of its own weight of sulfuric acid and heated to a temperature of from 100° C. to 140° C. It is preferred to employ amounts of acid in the lower end of the recited range, particularly from 0.05% to 0.5% to minimize the amount of required neutralization in the subsequent steps of the process.

The time of treatment at temperature may be extremely short, especially at the higher ends of the temperature and concentration ranges indicated. In the preferred lower range of acid concentration more satisfactory results are obtained if the charge is maintained at temperature from 1 to 6 hours, preferably not over 4 hours. The pressure during the acid treatment may be atmospheric or sub-atmospheric. The only lower limit on the pressure to be employed is the natural one of avoidance of glycerol loss by vaporization. Preferably the pressure is maintained at least 5 mm. of mercury above the vapor pressure of glycerol at the treating temperature. A particularly preferred set of conditions is to heat the glycerine containing fraction with 0.1% of its weight of sulfuric acid at 125° C. for 4 hours under 10 millimeters' pressure.

Within the ranges of acid concentration, time and temperature recited above it is preferred not to simultaneously employ high acidity together with high temperature and long time lest some glycerine be lost by thermal degradation. Thus when the acid concentration is above about 1% the temperature is preferably maintained below about 130° C. and the time of heating not longer than about 2 hours.

The acid-treated glycerine fraction is then neutralized and fractionally distilled. The neutralization may be accomplished in any suitable manner as by the addition of an alkali metal hydroxide or alkaline earth metal hydroxide, or by cooling and treatment with ion exchange resin. The latter method (ion exchange) is preferred since formation of salt in the product to be distilled is thus avoided. It is frequently desirable to dilute the acid treated product to about 50% solids before ion exchanging to obtain more efficient reaction with the solid resin. The effluent is then reconcentrated before proceeding with the recovery.

The acid treated and neutralized glycerol-containing product is then fractionally distilled under reduced pressure in conventional manner. The purity of glycerol thus obtained is markedly greater than can be obtained by fractional redistillation of the crude glycerol cut without first subjecting it to the described acid treatment and neutralization.

A most sensitive test for the purity of glycerol has been developed in connection with the manufacture of nitroglycerine where impurities of the type found in hydrogenolysis glycerine induce instability of the nitrated product in the presence of waste nitrating acid and detract from the safety of the process. The test is conducted by nitrating the glycerine to be tested under controlled conditions and noting the stability of the resulting acid-nitroglycerine mixture at an elevated temperature. More specifically 100 grams of the test glycerine is nitrated by adding it gradually, under continuous agitation, to a mixed nitrating acid containing 230 grams of $HNO_3$, while supplying external cooling to maintain the temperature between 41° and 43° F. A suitable mixed nitrating acid contains 49.7% $H_2SO_4$, 52.3% $HNO_3$, 0.2% $HNOSO_4$, −2.2% $H_2O$. The cooling should be such that the entire amount of glycerine may be run into the acid in from 15 to 25 minutes while maintaining the indicated temperature. Immediately upon completion of the glycerine addition, and without permitting separation of the two phases of the emulsified nitration mixture, duplicate 10 ml. samples are withdrawn from the nitrator and transferred to heat resistant glass tubes of 18 mm. outside diameter, 1.5 mm. wall thickness and 290 mm. length. The tubes are immersed in a constant temperature water bath maintained at 74° C. and covered loosely, as for example, by small watch glasses. The time required for the nitrated product to decompose violently is noted and recorded in minutes as the Stability in Contact with Waste Acid at 74° C.

By the foregoing test samples of glycerine containing impurities which cannot be detected by ordinary analysis will show greatly reduced stabilities. In general, glycerine with a stability below about 35 minutes is considered unsuitable for nitration in the commercial preparation of nitroglycerine for explosives because of the hazard that decomposition will set in after nitration is complete and before separation of the nitroglycerine from the spent acid is complete.

The following detailed examples are presented for a better understanding of the process of the invention and to illustrate specific embodiments thereof. It is to be understood that the invention is not limited to the specific materials and reactive conditions recited in the illustrative examples.

*Example I*

The crude hydrogenolysis product employed was the filtered and ion-exchanged autoclave discharge product obtained from the catalytic hydrogenolysis of a purified high test molasses. The dilute solution was concentrated by flashing off the water at 115° C., under 25-foot water vacuum. The concentrate was transferred to a batch still and steam-stripped without rectification under 25-foot water vacuum until the temperature of the still residue reached 195° C. Substantially all of the glycerol was in the distillate together with all condensable, more volatile components. A minor proportion of products less volatile than glycerine was also carried into the distillate.

The distillate was then fractionally distilled through a 30-inch column of Cannon packing first under 25 mm. mercury pressure and a 1:1 reflux ratio to remove water, and then under 10 mm. mercury pressure and 1:1 reflux ratio to a vapor temperature of 95° C. to remove glycols.

The still residue, which may be denominated "glycol free volatiles" was examined by paper chromatography and found qualitatively to contain (in addition to glycerol) erythritol, butanetriol, hexanetriol, and hydroxylated tetrahydrofuran derivatives. A sample subjected to the nitration waste acid stability test above described showed a stability of only 10 minutes.

A 500 gram portion of the glycol free volatiles (0.33% $H_2O$) was transferred to a 1000 ml. flask equipped with stirrer, thermometer, a Claisen adapter, condenser, receiver, Dry Ice trap, manometer, manostat and vacuum pump. 0.5 gram of sulfuric acid (0.1% of the charge weight) was added in the form of an approximately 20% solution. The pressure was reduced to 10 mm. and the temperature taken up gradually to 125° C. in about 30 minutes. The added water had mostly boiled out by the time the temperature reached 125° C. The charge was held at 125° C. under 10 mm. pressure for 4 hours. It darkened slightly changing in color from 5 Gardner-Holdt color units to 6. 14.2 grams of total distillate were collected in the receiver and trap of which 86.3% was water. This corresponds to 8.1 grams of water of reaction (i.e., water in addition to that in the initial charge and the added acid).

The contents of the flask were cooled, diluted with approximately an equal weight of water and neutralized by passing through a bed of anion exchange resin. The effluent was reconcentrated under vacuum at a temperature not exceeding about 60° C. The pH of the neutralized material was 7.6–8.0.

440.2 grams of the acid treated, neutralized and reconcentrated material (99.36% solids) were charged to a vacuum still equipped with a packed (Cannon) fractionating column 25 mm. in diameter and 30 inches long. Fractional distillation was conducted at 10 mm. pressure under a reflux ratio of 9:1. The distillate coming over at a temperature below 165° C. was discarded as forerun and amounted to 28% of the total recovery. The main fraction, amounting to 44% of the recovery distilled at 165–167° C. under 10 mm. pressure and was glycerine of high purity. The remaining 28% comprised material boiling higher than glycerine and was discarded. The total recovery was 98% of the original charge.

By paper chromatography the glyerine fraction showed no impurity spot. Its nitration waste acid stability was 85 minutes.

*Example II*

A 400 gram portion of the glycol-free volatiles described in Example I was transferred to the acid treating flask there described. 2.0 grams of sulfuric acid (0.5% of the charge) was added in the form of an approximately 20% solution and the temperature taken up gradually to 100° C. under a pressure of 50 millimeters of mercury. The temperature was maintained at 100° C. for 6 hours under 50 mm. pressure during which period 6.9 grams of distillate (96.9% water) were collected.

The contents of the flask were cooled and neutralized by the addition of 20.35 ml. of 2 N sodium hydroxide (equivalent to the acid added). The pH of the neutralized charge was 10.5 after efficient stirring.

The acid treated and neutralized product was fractionally distilled under vacuum employing the conditions of Example I. The forerun amounted to 29.2% of the total recovery and the main fraction, distilling at 165–167° C. under 10 millimeters comprised 44.1% thereof. Column holdup and residue totaled 26.6% and the total recovery was 96.8% of the charge. The main fraction was glycerine of high purity showing no spot other than glycerine by paper chromatography. Its nitration waste acid stability was 53½ minutes.

*Example III*

The crude hydrogenolysis product employed was the filtered and ion exchanged autoclave discharge product obtained from the catalytic hydrogenolysis of glucose solution. The dilute solution was concentrated by flashing off the water at 115° C. under 25-foot water vacuum. The concentrate was transferred to a batch still and steam stripped without rectification under 25-foot water vacuum until the temperature of the still residue reached 195° C. Substantially all of the glycerol was in the distillate together will all condensable more volatile components. A minor proportion of products less volatile than glycerine was also carried into the distillate.

The distillate was then fractionally distilled through a 30 inch Cannon-packed column, first at 25 mm. mercury pressure under 1:1 reflux ratio to remove water and then under 10 millimeters' mercury pressure. A glycol fraction was taken off under 1:1 reflux ratio up to a vapor temperature of 95° C. after which the reflux ratio was changed to 9:1 and a glycerine fraction collected distilling at 166° C. (vapor temperature). The distilled glycerine fraction, by paper chromatography, showed traces of a butanetriol and hexanetriol. Its nitration waste acid stability at 74° C. was 19½ minutes.

In the apparatus for acid treating glycerine described in the previous examples a 500 gram portion of the distilled glycerine fraction (3.87% H₂O) was treated with 0.05% sulfuric acid for 4 hours at 140° C. under a pressure of 10 millimeters of mercury. The distillate amounted to 30 grams and contained 82.2% water. The charge was cooled and neutralized by adding 9.62 ml. of 0.53 N barium hydroxide solution (equivalent to the sulfuric acid employed). The neutralized product had a pH of 9 and was fractionally distilled under 10 millimeters' pressure in the manner described above. The forerun amounted to 5.4% of the total recovery and the main fraction (vapor temperature 166–167° C.) to 67.7%. The column hold-up and still residue accounted for 26.9%. The total recovery was 96.9% of the charge. The main fraction was high purity glycerine, showing no impurity spot by paper chromatography and a nitration waste acid stability of 100 minutes.

For purposes of comparison a second portion of the same distilled glycerine fraction was fractionally distilled under the foregoing conditions without first subjecting it to the acid treatment described. The forerunnings amounted to 7.4% of the total recovery and the main fraction, distilling at 166–168° C., to 66.7%. By paper chromatography the redistilled main fraction showed a trace of hexanetriol but the nitration waste acid stability was only 26½ minutes.

It is thus clearly demonstrated that refractionation in the absence of acid treatment in accordance with the invention does not produce glycerine of satisfactory quality for nitration.

*Example IV*

A 500 gram sample of the distilled glycerine fraction described in Example III above was transferred to a 1-liter flask equipped with a short air condenser. 7.1 ml. of concentrated sulfuric acid (2.5% on the charge) was added and the temperature taken to 125° C. in about 30 minutes. This temperature was maintained for one hour under atmospheric pressure. The acid treated glycerine was cooled, diluted with approximately its own weight of water, neutralized by passing through a bed of anion-exchange resin, and reconcentrated under vacuum. The pH of the neutralized product was 7.0. The product was fractionally distilled at 10 millimeters' pressure through the column and under the conditions described in the preceding examples. Forerunnings, distilling at vapor temperatures up to 165° C., amounted to 7.2% of the recovered product. The main fraction, distilling at 166°–167° C. comprised 68.3%, the column hold-up and still residue accounting for the remaining 24.5%. The total recovery was 98.6% of the charge. The main fraction, by paper chromatography, showed no impurity spot and the nitration waste acid stability was 87½ minutes.

From the foregoing description and illustrative examples it is evident that the process of the invention, comprising acid treatment of the glycerol-containing fraction of the reaction mixture from hydrogenolysis of saccharidic materials prior to the final fractional distillation, results in a final product of higher quality, particularly with regard to suitability for nitration, than can be obtained by redistillation without acid treatment.

What is claimed is:

1. In the process of recovering high purity glycerol from the reaction mixture resulting from the catalytic hydrogenolysis of saccharidic materials the steps which comprise stripping said mixture under vacuum until the still residue is substantially glycerol free, fractionally distilling the strippings under vacuum to remove therefrom the major proportion of glycols and other components more volatile than glycerol and subjecting the resulting fraction containing the glycerol from the said mixture, together with impurities distilling therewith, to treatment with from 0.05% to 2.5% by weight of sulfuric acid at a temperature of from 100° to 140° C. for a time to about 6 hours, neutralizing the acid treated material, fractionally distilling the neutralized product under vacuum, and collecting the glycerine fraction.

2. A process according to claim 1 wherein the neutralization is accomplished by cooling the acid treated material and passing it through a bed of anion exchange resin.

3. A process according to claim 2 wherein the said distilled fraction is treated with from 0.05% to 0.5% by weight of sulfuric acid.

4. A process according to claim 3 wherein the time of heating is from 1 to 4 hours.

5. A process according to claim 1 wherein the neutralization is accomplished by addition of a base selected from the group consisting of alkali metal hydroxides and alkaline earth metal hydroxides.

6. A process according to claim 5 wherein the said distilled fraction is treated with from 0.05% to 0.5% by weight of sulfuric acid.

7. A process according to claim 6 wherein the time of heating is from 1 to 4 hours.

8. In the process of recovering high purity glycerol from the reaction mixture resulting from the catalytic hydrogenolysis of saccharidic materials the steps which comprise stripping said mixture under vacuum until the still residue is substantially glycerol free, fractionally distilling the strippings under vacuum to remove therefrom the major proportion of glycols and other components more volatile than glycerol and subjecting the resulting fraction containing the glycerol from the said mixture, together with impurities distilling therewith, to treatment with 0.1% by weight of sulfuric acid at 125° C. and 10 millimeters' mercury pressure for 4 hours, cooling, neutralizing by passage through a bed of anion exchange resin, fractionally distilling under 10 millimeters of pressure, and collecting the fraction boiling at 166° C.

References Cited in the file of this patent

UNITED STATES PATENTS

| | | |
|---|---|---|
| 251,992 | Battershall | Jan. 3, 1882 |
| 558,441 | Van Ruymbeke | Apr. 14, 1896 |
| 2,351,413 | Farber et al. | June 13, 1944 |
| 2,381,055 | Hoyt | Aug. 7, 1945 |
| 2,505,735 | Halbedel | Apr. 25, 1950 |

FOREIGN PATENTS

| | | |
|---|---|---|
| 430,576 | Great Britain | June 21, 1935 |